US012502826B1

(12) United States Patent
Schmitt et al.

(10) Patent No.: US 12,502,826 B1
(45) Date of Patent: Dec. 23, 2025

(54) METHOD FOR DESIGNING AND 3D PRINTING A SHOE WITH A PLURALITY OF OUTER SURFACE AREAS

(71) Applicant: Zellerfeld R&D GmbH, Hamburg (DE)

(72) Inventors: Cornelius Schmitt, Neustadt (DE); Antun Lovro Brkić, Halstenbek (DE); Ole Kröger, Hamburg (DE)

(73) Assignee: Zellerfeld R&D GmbH, Hamburg (DE)

( * ) Notice: Subject to any disclaimer, the term of this patent is extended or adjusted under 35 U.S.C. 154(b) by 0 days.

(21) Appl. No.: 19/275,787

(22) Filed: Jul. 21, 2025

Related U.S. Application Data

(63) Continuation of application No. PCT/EP2024/071335, filed on Jul. 26, 2024.

(51) Int. Cl.
*B29C 64/118* (2017.01)
*A43B 1/00* (2006.01)
*B33Y 10/00* (2015.01)
*B33Y 80/00* (2015.01)
*B29L 31/50* (2006.01)

(52) U.S. Cl.
CPC .............. *B29C 64/118* (2017.08); *A43B 1/00* (2013.01); *B33Y 10/00* (2014.12); *B33Y 80/00* (2014.12); *B29L 2031/50* (2013.01)

(58) Field of Classification Search
CPC ....... B29C 64/118; B33Y 10/00; B33Y 80/00; A43B 1/00
See application file for complete search history.

(56) References Cited

U.S. PATENT DOCUMENTS

| 8,844,167 | B2 | 9/2014 | Greene |
| 9,788,607 | B2 | 10/2017 | Waatti |
| 9,914,274 | B2 | 3/2018 | Jones et al. |
| 10,016,941 | B1 | 7/2018 | Beard et al. |
| 10,241,498 | B1 | 3/2019 | Beard et al. |

(Continued)

FOREIGN PATENT DOCUMENTS

| CN | 105050442 | * 11/2015 |
| DE | 102015212099 A1 | 12/2016 |

(Continued)

OTHER PUBLICATIONS

PCT/EP2024/071335 International Search Report and Written Opinion dated Mar. 11, 2025.

(Continued)

*Primary Examiner* — Mathieu D Vargot
(74) *Attorney, Agent, or Firm* — Wilson Sonsini Goodrich & Rosati

(57) ABSTRACT

The invention relates to a method for designing and 3D printing a shoe (100), wherein said shoe (100) comprises a plurality of outer surface areas (101, 102, 103) with different outer surface properties. The method comprises the steps of capturing design input data for a 3D shoe model defining the plurality of different surface areas (101, 102, 103); slicing the 3D shoe model based on the design input data with infill structures (131) at the different surface areas and based on a shoe size with an individual slicing model for said shoe size; and printing the shoe in a print cycle based on the individual slicing model and the respective shoe size.

26 Claims, 6 Drawing Sheets

(56) References Cited

U.S. PATENT DOCUMENTS

| | | |
|---|---|---|
| 10,638,927 B1 | 5/2020 | Beard et al. |
| 11,097,501 B2 | 8/2021 | Jones et al. |
| 11,358,340 B2 | 6/2022 | Sterman et al. |
| 11,425,961 B2 | 8/2022 | Sterman et al. |
| 11,584,084 B2 | 2/2023 | Miller |
| 11,993,048 B2 | 5/2024 | Jones et al. |
| 12,226,973 B2 | 2/2025 | Jones et al. |
| 2015/0351493 A1 | 12/2015 | Ashcroft et al. |
| 2017/0066196 A1 | 3/2017 | Beard et al. |
| 2017/0129172 A1 | 5/2017 | Waatti et al. |
| 2023/0337783 A1 | 10/2023 | Hatano |
| 2024/0383202 A1 | 11/2024 | Baggen et al. |
| 2025/0135740 A1 | 5/2025 | Jones et al. |

FOREIGN PATENT DOCUMENTS

| | | | | |
|---|---|---|---|---|
| DE | 202017103049 U1 | 6/2017 | | |
| EP | 3229637 A1 | 10/2017 | | |
| EP | 3685988 A1 | 7/2020 | | |
| EP | 3845087 A1 | 7/2021 | | |
| EP | 4408232 A1 | 8/2024 | | |
| EP | 4599730 A1 * | 8/2025 | ......... | A43B 23/0245 |
| WO | WO-2022136031 A1 | 6/2022 | | |
| WO | WO-2024238816 A1 | 11/2024 | | |
| WO | WO 2025/168306 * | 8/2025 | | |
| WO | WO-2025168306 A1 * | 8/2025 | ......... | A43B 23/0245 |

OTHER PUBLICATIONS

PCT/EP2025/050774 International Search Report and Written Opinion dated Mar. 8, 2025.

PCT/EP2021/085762 International Search Report and Written Opinion dated Mar. 31, 2022.

Nachtigall, T. R., Towards ultra personalized 4D printed shoes. In CHI 2018—Extended Abstracts of the 2018 CHI Conference on Human Factors in Computing Systems: Engage with CHI Article CS20 Association for Computing Machinery, Inc., 2018.

* cited by examiner

METHOD FOR DESIGNING AND 3D PRINTING A SHOE WITH A PLURALITY OF OUTER SURFACE AREAS

CROSS-REFERENCE TO RELATED APPLICATIONS

This application is a continuation of PCT International Application No. PCT/EP2024/071335, filed Jul. 26, 2024, the contents of which is incorporated herein by reference in its entirety.

TECHNOLOGY OF THE PRESENT INVENTION

The present invention relates to a new method for designing and 3D printing a shoe. In particular, the present invention relates to an improved method for designing and 3D printing a shoe comprising a plurality of outer surface areas having at least two different external appearances and/or properties. The present invention also relates to the resulting shoe which provides predetermined outer appearances and/or softness or flexibility at the plurality of outer surface areas.

BACKGROUND 3D printing is often used to produce parts that could just as easily be made using another manufacturing technique. While the end result may look the same, it is the inside that is often important.

One benefit of 3D printing is the ability to vary the hollowness of a part. In manufacturing terms, a hollow part requires less time and material than a solid one, thereby reducing the overall weight, production time and costs. The inside of a 3D print is called infill, and it can be adjusted in terms of density of volume: 0% is hollow while 100% is solid. Furthermore, how a part is filled in can be adjusted according to a wide variety of infill patterns.

The inventors of the present invention already filed the application WO 2022/136031 A1 which relates to a shoe consisting of a shoe upper and a sole, the upper and the sole being made as a single piece from at least one thermoplastic material in a 3D printing process. The upper and the sole have different structures.

The 3D printing of a shoe using known methods often results in a shoe with a sufficiently firm and stable sole, but often with a relatively stiff shoe upper. The inventors of the present invention have already developed a method for 3D printing a shoe upper with improved softness, which significantly improves the wearability and comfort of the printed shoe.

When the design of the 3D printed shoe includes multiple outer sections with different appearances, e.g., sections with an outer mesh structure and sections with a closed outer appearance, the closed outer sections often result in "islands" in the shoe upper that are relatively stiff compared to the printed mesh structure. Also, the connection between closed outer sections and sections with mesh structures is often very stiff and/or unstable.

An objective of the present invention is therefore to improve the overall softness of a shoe, in particular a shoe upper, for shoes having a plurality of different outer surface areas. Another objective is to provide a method that enables a simplified process for designing a shoe with different outer surfaces and subsequent 3D printing with improved softness of the shoe.

SUMMARY OF THE INVENTION

The subject-matter of the present invention is defined by the features of the independent claims. Further embodiments are defined in the dependent claims.

In general terms, the present invention relates to a transformative method and system for 3D printing of footwear, enabling the automatic application of multiple textures on a printed shoe directly from predefined surface properties in a 3D model. The technology of the present invention facilitates, for example, a seamless transition between different textures, such as rough and smooth surfaces, and varying shoe properties like closed or open mesh within a single print cycle. This can be achieved without manual intervention, greatly enhancing design flexibility and manufacturing efficiency in footwear production. Moreover, this method can also maintain the shoe's stiffness variability to a minimum regardless of the chosen texture, which can increase comfort. This can also ensure, for example, that the functional integrity of the footwear is not compromised by the addition of multiple textures.

The method of the present invention interprets the surface properties of the digital model and translates them into specific printing instructions that specify the application of textures during the printing process. This method significantly streamlines the production of custom-designed footwear, enabling rapid prototyping and mass production capabilities for shoes that meet a wide range of consumer preferences and functional needs.

Conventional 3D printing processes for shoes present significant challenges when it comes to applying multiple textures or achieving different material properties without extensive manual adjustments or time-consuming post-processing steps. Such limitations inhibit design innovation, lead to longer production times and cause costs to escalate. The present invention addresses these issues by introducing a new method which can automatically process texture applications which use the digital model's surface properties in a direct way.

This automation not only streamlines the manufacturing process, but also paves the way for the production of shoes with unparalleled aesthetics and functional performance, while maintaining the structural integrity and consistency of the shoe, such as a consistently soft shoe upper.

Moreover, system and method of the present invention significantly enhances communication between the design and manufacturing teams. Traditionally, conveying intricate design intentions required the transfer of several models to capture different textures or material properties, complicating the production process. With the present invention, only a single, comprehensive 3D model is sufficient, simplifying the transfer and interpretation of design specifications.

Another substantial advantage of the present approach is its ability to apply wall thicknesses in precise increments corresponding to the printer's line widths. This capability can be maintained across shoes of varying sizes, a feat unachievable with traditional volume-based methods that result in inconsistent thicknesses due to scaling and grading. Thus, the approach of the present invention can ensure that the structural and functional aspects of the footwear are not compromised, irrespective of size variations, thereby maintaining design integrity and wearability.

When compared to a standard approach where a slight change in different textures would involve manual labor in preparing the different models and any aesthetic change would also change the wearability of the shoe.

The process from design to printing to the finished product can be illustrated as follows:

I. Digital Model Preparation: Designers commence the process by constructing a volume-based 3D model of the shoe, which defines the overall form and dimensions. At the same time or subsequently, a plurality of surface types, e.g., closed, meshed, etc., and their respective placement or location on the outer surface of the shoe are defined, e.g., by means of a surface model of the shoe. According to a preferred embodiment, at least one 3D surface model is created that overlaps the outer shape of the volume-based shoe model. This layered approach helps to specify surface properties, including desired textures and material characteristics, for different sections of the footwear. These surface properties can be designated as separate entities adjacent to the main model or encoded as attributes of the model's polygons. A strategy like this allows precise control over the texture and appearance of the outside of the shoe, while the inside, the areas that come into contact with the foot, remain consistent and comfortable.

II. Automated Texture Application: Upon receiving the digital model, the system's software identifies the specified surface properties and converts them into detailed printing instructions (e.g. as gcode). Designers have the flexibility to provide multiple overlapping surfaces, each associated with a distinct surface treatment. This method ensures that textures are applied precisely as intended during the printing process, aligning perfectly with each section of the footwear. The process not only respects the designer's artistic vision but also significantly streamlines the transition from design to production.

III. Maintaining Shoe Stiffness and Variability: Throughout the printing process, the system controls material properties and printing parameters to ensure that the application of various textures does not affect the shoe's stiffness or variability. Thus, while the outer appearance of the shoe may vary with different textures, the internal characteristics that impact comfort and fit, such as the interior mesh that contacts the foot, preferably remain unchanged. This distinction is crucial, particularly when compared to volume-based approaches that could alter the internal makeup of the shoe with changes in external texture, potentially compromising comfort, and performance.

The method and system improve the 3D printing of shoes and offer a way to produce highly individualized, multitextured shoes that can be produced efficiently, quickly, easily, and inexpensively without compromising the functional integrity of the product. Accordingly, the present invention provides a method and system for 3D printing footwear, enabling an automated application of multiple textures on a printed shoe based on predefined surface properties in the 3D model. This technique can ensure a smooth transition between diverse textures (e.g., rough, smooth) and shoe properties (closed or open mesh), preferably within a singular printing process, enhancing design versatility and manufacturing efficiency.

Preferably, the method of the present invention does not compromise the stiffness or variability of the shoe. The method also simplifies communication between design and manufacturing and enables precise "scaling" and gradation of textures, further streamlining the production process.

According to a first aspect, the present invention relates to a method for designing and 3D printing a shoe, preferably an entire shoe, e.g., with a shoe sole and a shoe upper. This method provides a new approach how a designer can design different surface properties of a shoe upper, wherein the shoe is subsequently printed, preferably within a single print cycle. The printed shoe comprises a plurality of outer/exterior surface areas (also called portions or sections) with different outer surface properties. For instance, the different outer surface properties can relate to the outer appearance (e.g. closed surface, meshed surface, etc.) and/or different textures. A shoe designer or even an end user may design a new shoe and/or the outer appearance of a shoe with a design software which may be provided as an application (app) or may be provided on a web page. A shoe designer may design the shoe upper and/or the shoe sole. Since the sole of the shoe is relatively stiff and the shoe upper material should be relatively soft in comparison to the sole of the shoe in order to increase the comfort of the shoe, the advantages of the present invention are particularly noticeable in the upper material. The respective design data of the new design are then used or captured for a 3D shoe model which preferably defines the shoe and preferably defines at least the plurality of different surface areas.

According to the present invention, the shoe model with the design of the shoe upper is preferably provided as an entire 3D model, which is different from the prior art which typically comprises a plurality of 3D models for each part of the shoe with a specific design. In the prior art, these different 3D partial models are manually "assembled" and subsequently printed. As a result, there are "edges" between these 3D partial models in the printed shoe, which also make themselves noticeable as "islands" with a different softness than the surrounding areas.

The use of a single 3D model according to the present invention provides, for example, the advantage that such edges or borders can be avoided in the subsequent 3D slicing and printing step, so that the outer appearance and softness of the shoe upper can be significantly improved. In other words, the present invention involves creating a seamless shoe upper with substantially consistent infill density and properties, even when incorporating closed elements on the outside of the shoe upper.

In particular, the slicing step of the 3D shoe model is based on the design input data and calculates infill structures at the various surface areas, preferably on the basis of a shoe size with an individual slicing model for this shoe size.

For example, a shoe has a closed strip element in the middle of the outer surface of the shoe upper having a width which is approximately 10% of the shoe width. A shoe in size 35 and a shoe in size 45 still provide said strip element with a width of 10% of the shoe width. However, since each shoe size is individually sliced, the number of infill connections lines below said closed stripe element may differ at the different shoe sizes. For instance, in the smaller shoe the number of infill connection lines may be smaller than the number of infill lines at the larger shoe but both shoes provide essentially the same softness properties. This is achieved, for example, by ensuring that the distance between the infill lines, e.g., directly adjacent infill lines, is essentially the same, regardless of shoe size.

This is very different from known prior art slicing and printing methods in which, for example, one shoe size is sliced, e.g., size 42, and different sizes are printed by scaling up or down from this one shoe size. This means that a smaller and a larger shoe have the same number of fill lines, so that the softness properties of a small shoe are usually much harder than those of a larger shoe.

According to the present invention, the shoe, preferably the entire shoe is printed, preferably in a single print cycle based on the individual slicing model and the respective shoe size. According to the present invention, the preferred individual slicing is dependent on the size which provides, e.g., an advantage that specific properties of the shoe can be achieved in contrast to the scaling method as done in the prior art. For instance, slicing a small size by simply scaling the slicing step to a larger size, as done in the prior art, results, e.g., in thicker wall thickness of the larger shoe and therefore different properties of the shoe.

It is preferred that the design input data of the shoe model are transformed into a one-volume-model of the entire shoe such that the slicing step is performed on said one-volume-model. The surface properties are preferably defined in a surface model such that a shoe according to the present invention is preferably based on a single 3D model combined with a surface model. In contrast thereto, the prior art methods used a multi volume model, e.g. combining a plurality of 3D models, wherein the shoe is subsequently printed in that the multiple volumes are "assembled", which has certain drawbacks as discussed later in the detailed description.

Such a one-volume-model of the present invention allows, for example, a continuous slicing step across a cross-section through the entire shoe, which preferably allows for a one-stroke-printing of a single layer, preferably without retraction of the printing head during printing of said layer.

It is further preferred that a designer or even a user can design, e.g., via a design platform, the locations on the outer surface of the shoe where the plurality of outer surface areas are desired and the surface properties of the plurality of outer surfaces, preferably by selecting individual properties form a predefined list.

Such a design platform can be provided through a web browser, an application (app, app for smart phone), or an application that runs on a computer's operating system.

The design input data preferably comprises data relating to the shoe size, wherein the slicing step is performed depending on the shoe size such that printed shoes of different sizes have infill structures which are not obtainable by simple scaling the slicing data of one shoe size to slicing data of another shoe size. It is therefore preferred that different sizes of the same printed shoe model have the same outer surface properties, preferably regarding mesh structure, mesh size, softness, etc.

The method of present invention can also be used to produce customized fit shoes by providing additional foot measurement data. For instance, a method of making a customized shoe may comprise the following steps: capturing, e.g., using a computer, foot measurements of a user; capturing design input data for a 3D shoe model; slicing the 3D shoe model and printing the customized shoe. Said foot measurements can include, e.g., a widest part and a longest part of a left foot and/or right foot of a user.

According to a further aspect, the present invention also relates to a method for 3D printing at least a part of a shoe, preferably an entire shoe, within a print cycle, wherein said shoe part comprises a plurality of portions arranged along the outer surface of the shoe or the shoe upper. At least a first portion and a second portion are located directly adjacent to each other along the outer surface of the shoe upper having different outer appearances/surface properties/textures. Portions or sections of the shoe, in particular the shoe upper, can be defined in relation to the outer surface of the upper. In particular, sections can be defined as sections located between lines perpendicular to the top surface.

The method comprises: additively printing the shoe layer-by-layer, wherein at least one printing layer, preferably a plurality of (subsequent) printing layers define the outer surface of the shoe, an inner surface of the shoe and an intermediate section which connects the outer surface and the inner surface by an infill structure. The structure of the infill substantially determines the softness of the shoe upper. For instance, infill lines which connect the shoe upper and the shoe inner surface by infill connections lines which are substantially perpendicular to the outer and inner surface result in a rather stiff shoe part, while infill connection lines with angles, e.g., more than 10°, more than 20°, more than 30° to the normal of the surface result in softer properties. In other words, it is preferred according to the present invention to avoid infill connection lines which are substantially perpendicular to the upper surface.

Such perpendicular infill connection lines are, however, typically created in prior art slicing models in which different surface properties are handled in separate slicing models wherein the entire shoe slicing can be seen as aggregation of these plurality of models. For instance, areas with a closed outer surface are generated as separate models which results in the slicing step and therefore in the gcode and the printing pattern in form of "island", as shown, e.g., in FIG. 5A. With the method of the present invention, such an island can be avoided which results in softer shoe upper. In other words, the infill density is preferably consistent across the entire shoe upper which can ensure uniform strength and aesthetic quality. Hence, even by integrating closed shell upper sections, the infill transition between a mesh structure and such closed shell structure is seamless such that isolated sections or "islands", known from prior art methods, can be avoided.

For instance, the outer surface at the first portion may form a closed outer surface and the appearance of the second portion, adjacent to the first portion, may have a meshed outer structure, wherein the infill structure according to the present invention at the first portion and second portion is substantially the same. It is preferred that the transition between these two portions is seamless or uniform, preferably without perpendicular separation wall(s) between these two portions. Since the slicing and printing is preferably based on a single 3D shoe model, the infill from one section to the directly adjacent section differs from a respective transition of prior art 3D printed shoes which are based on multiple 3D models.

In particular, according to the present invention, at least one printed infill connecting line, preferably at least two adjacent infill connecting lines extend(s) from the first portion to the second portion without interruption. This is not the case for prior art methods which comprise at least one substantially perpendicular separation line between these two portions (a line seen in a single printing layer which is a wall in multiple printed layers).

The infill structure at said two portions is similar; even if one portion provides an outer mesh appearance, and the other outer surface provides a closed outer appearance. Perpendicular wall sections of the infill between the two portions can be avoided such that, e.g., diagonal continuous infill lines between these two portions are possible which improve softness of the shoe upper. A connecting line, or at least two adjacent connection lines, without interruption may be also characterized as a continuous line(s), as further described below with respect to the figures and the detailed description. Preferably, at least two, preferably three, four or even more printed infill connecting lines extend from the first portion to the second portion without interruption.

Different outer appearance may be achieved by printing a plurality of subsequent layers at the first portion, which provide an outer surface of the first portion with a continuous closed outer appearance and/or printing a plurality of subsequent layers at the second portion, which provide an outer surface of the second portion, with a mesh structure outer appearance. It is further preferred that subsequently printed layers of the first outer surface comprise at least a continuous line along the outer surface in said first portion and/or subsequently printed layers of the second outer surface comprise alternate printed lines and gap portions along the outer surface in said second portion, which creates e.g., a mesh structure when several printed layers are taken into account.

It is further preferred that a printed layer at the first outer surface comprises a continuous line along the outer surface as an outermost printed line to create the closed outer surface. According to a further preferred embodiment, at least one second outermost line may be constructed/printed directly adjacent to said outermost printed line and inwardly to said outermost printed line. In short, at least one or at least two outer printed "walls" or lines (seen within a printed layer) are provided at a first portion.

The infill structure is printed inwardly from said at least one outermost line or said second outermost line to the inner surface of the shoe upper and preferably comprises connection lines to points on the inner surface, wherein said connection lines are preferably direct connections between points directly adjacent to said second outermost line and points on to the inner surface. Instead of direct connections, curved or meander patterned lines, which comprise portions of third outermost lines which are intersected by gap parts of the meander along the second outermost line may be used.

It is further preferred that the inner side (surface) of the shoe, i.e., said part of the shoe which gets into contact with the foot, comprises a continuous inner structure, for example a textile-like or mesh structure without seam-like contours, which not only increases comfort but also allows gas or fluid transfer through air-permeable passages, which can, for example, prevent sweaty feet.

The infill structure of said first and second portions preferably comprises a plurality of infill connecting lines. It is further preferred that at least one, preferably a plurality or each infill connecting line connects a point adjacent to the outer surface with a corresponding point on the inner surface, wherein preferably each connecting line comprises an orientation angle (a) with respect to a normal axis which is perpendicular to the outer surface. The difference of orientation angles, $\Delta\alpha=\alpha i-\alpha i+1$, of two infill connecting lines which are directly adjacent seen along the outer surface in the printing layer, is preferably smaller than 30°, preferably smaller than 20°, preferably smaller than 10° in the first portion, second portion and/or a transition portion which is party build by the first and second portion.

The first and second outer surfaces are preferably located at the shoe upper, wherein the sole of the shoe is preferably printed with a continuous outer surface.

With the method of the present invention, it is also possible that the pattern of a printed layer is printed continuously without retraction of a printing head, preferably the entire shoe is printed in one stroke/cycle.

It is further preferred that the shoe comprises along the outer circumference more than two portions with different outer appearance, preferably more than three, more than four, more than five or six and further preferred more than ten.

The first and the second portions, preferably more than two of the plurality of the portions are preferably at least 0.5 cm long measured along the outer surface, preferably more than 1 cm, preferably more than 2 cm, and preferably less than 10 cm.

According to a further aspect, the present invention also refers to a 3D-printed shoe produced by additively printing the shoe layer-by-layer, preferably printed by a method according to the present invention. Accordingly, the shoe preferably comprises: a plurality of portions arranged along the outer surface of the shoe, preferably along the outer surface of the shoe upper. The plurality of portions comprise at least a first portion and a second portion located directly adjacent to each other along the outer surface of the shoe having different outer appearances/surface properties/textures. At least one printing layer defines the outer surface of the shoe, an inner surface of the shoe and an intermediate section which connects the outer surface and the inner surface by an infill structure. The printing layer of the outer surface at the first portion forms a closed outer surface and the second portion forms a mesh outer structure, wherein the infill structure of the first portion and second portion is substantially the same.

The same filling structure in the first and second portions can be achieved, for example, by the same density of filling lines, the same angles of the same filling lines, the same distribution of filling lines and/or the same pattern of filling lines. It is also preferred that the transition between the first and second portions is seamless, for example, without intermediate, substantially perpendicular walls.

A further aspect of the present invention relates to a set of 3D printed shoes with at least two shoes with the same design but a different size, preferably printed by the same method, wherein the at least two shoes of different sizes comprise the same outer surface areas, scaled by a scaling factor, but comprise different infill structures, preferably different amount and/or directions of infill lines of the infill structure, at respective same portions of the shoes, which is not achieved by scaling the infill from one shoe to the other shoe with the different size by a scaling factor. In particular, the effect of the different infill structure is greater when the difference in shoe size is greater. For instance, the difference between shoes with a size difference of at least 5 shoe sizes in EU sizing is visible in the infill pattern.

The present invention may be also be described by the following list of aspects:

1. Method for 3D printing at least a part of a shoe, preferably an entire shoe, within a print cycle, preferably a single print cycle, wherein said shoe part or said shoe comprises a plurality of portions or sections arranged along the outer surface of the shoe, a first portion and a second portion located directly adjacent to each other along the outer surface of the shoe having different outer appearances/surface properties/textures, the method comprising: additively printing the shoe part layer-by-layer, wherein at least one printing layer, preferably a plurality of subsequent printed layers, define(s) the outer surface of the shoe, an inner surface of the shoe and an intermediate section which connects the outer surface and the inner surface by an infill structure. Said infill structure comprises at least one printed infill connecting line extending from the first portion to the second portion without interruption.

2. The method of aspect 1, wherein at least two, preferably three, four or even more printed infill connecting lines extend from the first portion to the second portion without interruption.
3. The method of aspect 1 or 2, wherein printing a plurality of subsequent layers at the first portion provide/create an outer surface of the first portion with a continuous closed outer appearance and/or printing a plurality of subsequent layers at the second portion create an outer surface of the second portion with a mesh structure outer appearance.
4. The method of aspect 1, 2 or 3, wherein subsequently printed layers of the first outer surface comprise at least a continuous line along the outer surface in said first portion and/or subsequently printed layers of the second outer surface comprise alternate printed lines and gap portions along the outer surface in said second portion.
5. The method of any of the preceding aspects, wherein a printed layer of the first outer surface (11) comprises a continuous line along the outer surface as an outermost printed line and comprises at least one second outermost line directly adjacent to said outermost printed line and inwardly to said outermost printed line, wherein the infill structure printed inwardly to said second outermost line preferably comprises connection lines to points on the inner surface, wherein said connection lines are preferably direct connections between points directly adjacent said second outermost line and points on to the inner surface, and/or connection lines with a meander pattern which comprise portions of third outermost lines which are intersected by gap parts of the meander along the second outermost line.
6. The method of any of the preceding aspects, wherein said infill structure of said first and second portions comprises a plurality of infill connecting lines connecting a point adjacent to the outer surface with a corresponding point on the inner surface, wherein each connecting line comprises an orientation angle ($\alpha$) with respect to a normal axis which is perpendicular to the outer surface, wherein the difference of orientation angles, $\Delta\alpha=\alpha_i-\alpha_{i+1}$, of two infill connecting lines which are directly adjacent seen along the outer surface in the printing layer, is smaller than 30°, preferably smaller than 20°, preferably smaller than 10° in the first portion, second portion and/or a transition portion which is partly build by the first and second portion.
7. The method of any of the preceding aspects, wherein inner surface comprises at least at the upper of the shoe a seamless mesh structure, which can enhance the wearing comfort.
8. The method of any of the preceding aspects, wherein the first and second outer surfaces are located at the shoe upper, wherein the sole of the shoe is preferably printed with a continuous outer surface.
9. The method of any of the preceding aspects, wherein the pattern of a printed layer is printed continuously without retraction of a printing head, preferably the entire shoe is printed in one stroke/cycle.
10. The method of any of the preceding aspects, wherein the shoe comprises along the outer circumference more than two portions with different outer appearance, preferably more than three, more than four, or even more than 10.
11. The method of any of the preceding aspects, wherein the first and the second portion, preferably more than two of the plurality of the portions are at least 0.5 cm long measured along the outer surface, preferably more than 1 cm, preferably more than 2 cm, . . . and preferably less than 10 cm.
12. A 3D-printed shoe, preferably printed by a method according to any of aspects 1-11, wherein the shoe comprises: a plurality of portions arranged along the outer surface of the shoe, wherein a first portion and a second portion are located directly adjacent to each other seen along the outer surface of the shoe with different outer appearances/surface properties/textures, the method comprising: additively printing the shoe layer-by-layer, wherein at least one printing layer defines the outer surface of the shoe, an inner surface of the shoe and an intermediate section which connects the outer surface and the inner surface by an infill structure. Said infill structure comprises at least one printed infill connecting line extending from the first portion to the second portion without interruption, i.e., continuously over the two directly adjacent areas.
13. At set of 3D printed shoes with at least two shoes with the same design but a different size, preferably printed by the same method, wherein the at least two shoes of different sizes, preferably with a size difference of at least 5 shoe sizes, comprise the same outer surface areas, scaled by a scaling factor, but comprise a different infill structure, preferably different amount and/or directions of infill lines of the infill structure, which is preferably not achieved by scaling the infill from one shoe to the other shoe with the different size by a scaling factor.

BRIEF DESCRIPTION OF THE FIGURES

Preferred embodiments of the present invention are further elucidated below with reference to the figures. The described embodiments do not limit the present invention.

FIG. 1A shows a side view of a shoe with a sole and different surface areas on the shoe upper;

FIG. 1B shows a cross-sectional view of the shoe from FIG. 1A taken along line A-A designed and printed according to a prior art approach which is based on multiple models;

FIG. 1C shows a cross-sectional view of the shoe taken along line A-A in FIG. 1A but designed and printed according to present invention;

FIGS. 2A1-A4 are schematic visualizations how gcode of a closed surface area with underlying infill may be constructed for different shoe sizes according to an embodiment of the present invention;

FIGS. 2B1-B4 are schematic visualizations how gcode of a closed surface area with underlying infill may be constructed for different shoe sizes according to another method;

FIGS. 2C1-C4 are schematic visualizations how gcode of a closed surface area with underlying infill may be constructed for different shoe sizes according to another method;

DETAILED DESCRIPTION OF THE INVENTION

Figure 1:
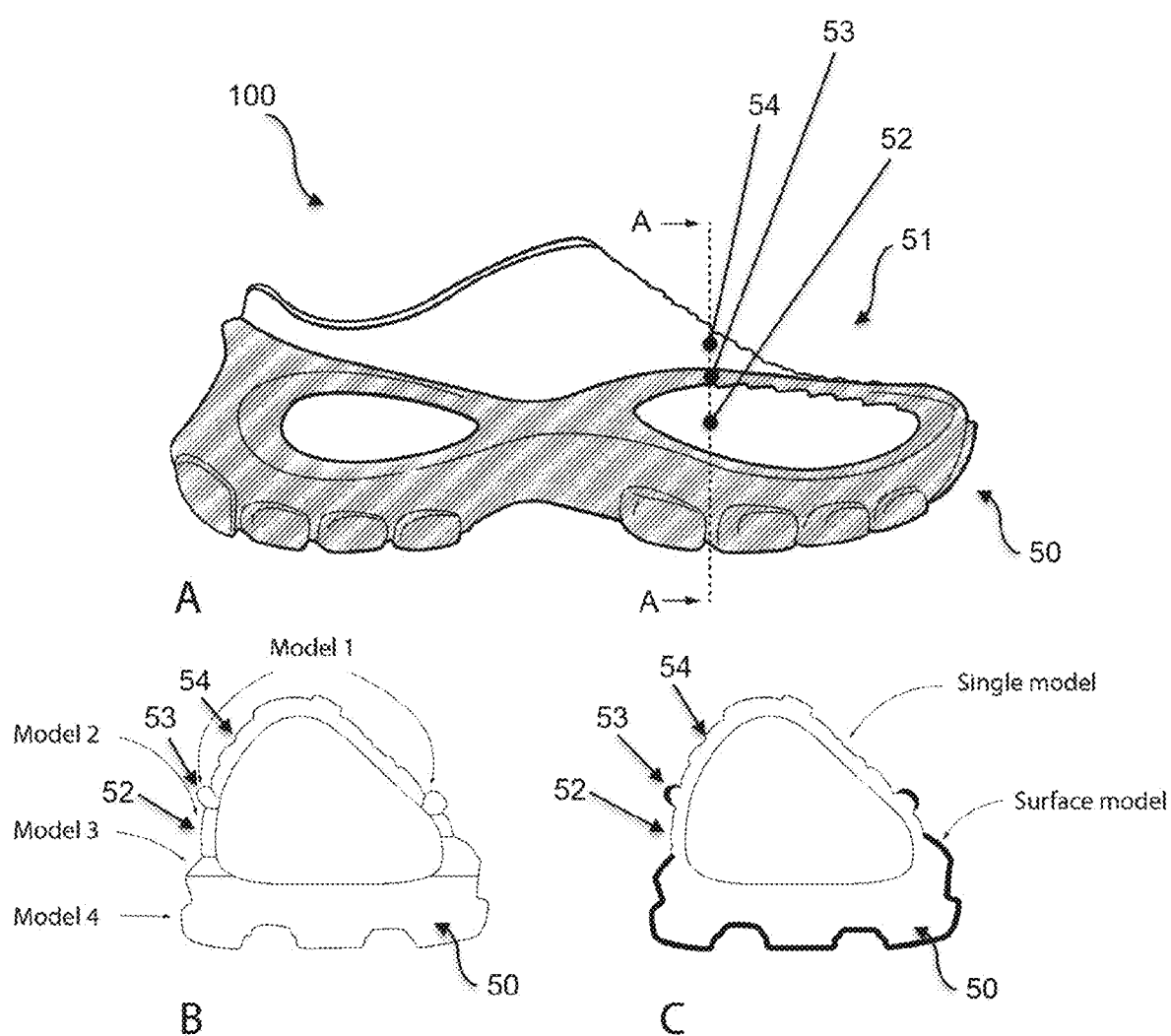

For a better understanding of the new method of 3D printing of a shoe according to the present invention over the art, a prior method and the new method will be discussed based on an exemplary shoe with a sole and a plurality of different surface areas on the shoe upper, as illustrated in FIG. 1.

In particular, FIG. 1A illustrates a side view of a shoe 100 with a sole 50 and a shoe upper 51. The shoe upper 51 comprises a plurality of outer surface sections 52, 53 and 54 with different outer properties. For instance, the shoe upper 51 comprises along line A-A in FIG. 1A at least an outer structure 52 with a meshed outer appearance and directly adjacent thereto an outer surface section 53 with a different outer surface structure, e.g., a closed outer surface. Along line A-A, another external surface section 54 is shown directly next to external surface section 53, which has a different external surface structure than section 53, e.g. with a meshed external surface structure. The outer surface structures 52 and 54, which are both illustrated as meshed outer surface structure, may be the same structures, similar structures of different structures. For the understanding of the present invention, it is already sufficient to view two directly adjacent surface structures with a different outer appearance, e.g., comparing structure 54 and 53 or comparing 52 and 53 to understand how different outer appearance can be achieved but similar underlining infill structures provides the above discussed advantages.

FIGS. 1B and 1C show cross-sections along line A-A of FIG. 1A through a shoe model with a plurality of different surface areas, e.g. the surface areas or surface sections 52, 53 and 54. FIG. 1B shows a cross-section according to an approach of the prior art, which is further exemplified in the flow chart of FIG. 3, while FIG. 1C shows a cross-section of the shoe according to an embodiment of the present invention, which is further exemplified in the flow chart of FIG. 4.

As already mentioned in the background section above, several 3D printing technologies have attempted to address the challenge of applying textures and complex designs to printed objects. The following brief overview of existing prior art technologies provides an insight into some existing solutions and highlights the unique advantages of the present invention for the automated 3D printing of shoes with multiple textures based on surface properties.

Current approaches to 3D printing textures:
PrusaSlicer Texture Feature (https://forum.prusa3d.com/forum/prusaslicer/texture-feature/): Discussions in the Prusa community highlight a slicer-based approach to adding textures to 3D prints. While it represents a step towards customizable textures, it falls short in feature diversity and practical implementation compared to the present invention.

Raise3D IdeaMaker Texture Feature (https://profound3d.com/blogs/news/raise3d-ideamaker-4-1-0-includes-texture-feature): The IdeaMaker slicer introduces texture features that modify the model at the slicer level. However, this approach is limited to uniform modifications across the entire model and focuses solely on altering the exterior wall's positioning rather than its intrinsic properties.

3D Printed Surface Textures (https://3dstartpoint.com/3d-printed-surface-textures): This general overview of applying 3D printed textures highlights traditional methods requiring extensive model adjustments for each variation, leading to significant time and resource consumption.

Complex Textured Shapes via Bump Mapping (https://grabcad.com/tutorials/how-to-create-incredibly-complex-textured-shapes-for-3d-printing-using-bump-mapping): This tutorial explores model-level modifications to achieve textured surfaces through bump mapping. Like other traditional methods, it requires comprehensive changes to the model for each texture application, impacting efficiency.

Bambu Lab Slicer Surface Painting: This technique enables users to paint surfaces directly within the slicer, allowing for the use of different filaments to create multi-color prints. However, its application is confined to slicer-level surface modifications without the ability to incorporate external models. While innovative for multicolor printing, it lacks focus on preserving the functionality and material properties essential for varied applications.

In brief summary, the prior art has at least the following limitations. It can only be edited within their slicer software and does not support the use of external input files. The prior art generates volumes from the input surfaces that are merely in contact without any connections, whereas the present invention creates a unified extrusion move to combine them seamlessly. The prior art is often designed for use with multiple filaments or tools and cannot change outside properties using the same tool, as the present method allows.

The present inventors of the present invention developed internally several methods to overcome the above-mentioned prior art methods. According to a method illustrated in FIG. 3, a designer starts with designing a 3D model of a shoe. Based on the design data of the 3D model of the shoe, certain information is provided which will be subsequently used by a slicer. For instance, a one volume model of the entire shoe may be provided. Moreover, information regarding outer surface areas will be provided, e.g. information regarding surface matching the outside of the model to differentiate the properties of the outer surface areas, e.g., closed outer surface, meshed, rough or any other kind of outer surface. Based on these different outer surfaces, a 3D modeler manually splits the shoe into components relating to these different outer surfaces of the shoe.

For instance, as illustrated in FIG. 1B, surface section 53 with a closed outer structure is represented by Model 1, surface section 52 with a meshed outer structure is represented by Model 2, the transitional section between the shoe upper and the sole 50 is represented by Model 3 and the sole 50 is represented by Model 4. A person skilled in the art understands that the other parts of the shoe, e.g., on the right side of the cross-section of FIG. 18 can be correspondingly represented by different or similar Models. The information from the various 3D models is then passed on to the slicer, which calculates the print lines layer by layer, e.g. how the outer and inner surfaces are to be printed layer by layer and how the filling is to be printed. As characterized in the flow chart in FIG. 3, the multiple 3D models based on the different outer surface areas are used to ensure that the different outer properties are provided, e.g., closed outer surface shell, meshed outer surface etc. Subsequently the slicer calculates the printing line based on these different 3D models. This prior art approach has several consequences. For instance, different sizes of the shoe are based on the same information such that different sizes have the same number of outer printed lines, the same number of infill lines on a respective layer by layer basis. In other words, different sizes of the same printed shoe can be achieved by scaling up or down the slicer information from a reference size. Said slicer information is finally sent to the 3D printer.

This state-of-the-art approach also has certain disadvantages when the surface properties change, e.g., when a designer or user wants to change the appearance of already designed surface areas and/or when the position of the surface areas is to be changed. The process would have to start from scratch, i.e., the various 3D models would have to be remodeled.

In contrast to such prior art approaches, the method of the present invention introduces a transformative approach to 3D printing footwear, enabling the application of multiple textures directly from the 3D model's surface properties. Unlike existing technologies that often require uniform model alterations or slicer-level adjustments, the present invention allows for selective texture application on specific sections of the footwear. This capability not only enhances design flexibility but also significantly reduces the time and computational resources required for model preparation.

Furthermore, the present invention facilitates easier communication between design and manufacturing by using a single, comprehensive model. This contrasts sharply with current practices that necessitate multiple models for different textures. Additionally, the present invention enables the application of wall thicknesses in discrete steps, tailored to the shoe's graded size, overcoming limitations of volume-based methods that could alter desired thicknesses.

Figure 4:
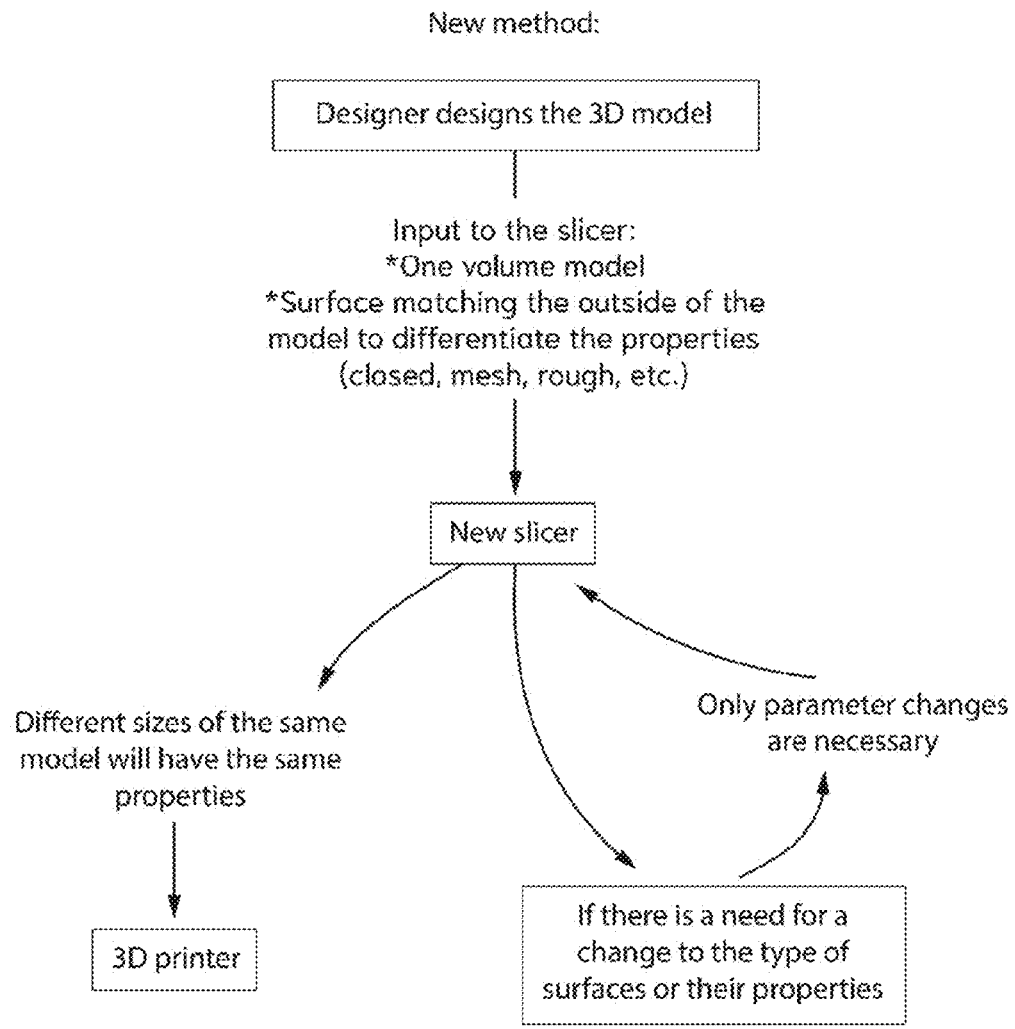
FIG. 4 is a flow chart of the method of the present invention, illustrating steps from the design to the printed end product.

According to a method of the present invention illustrated in FIG. 4, which is also called "new" method, a designer starts with designing a 3D model of a shoe. Based on the design data of the 3D model of the shoe, certain information is provided which will be subsequently used by a slicer. According to the new method, the information is directly feed to the slicer (called "new slicer"). For instance, a one volume model of the entire shoe may be provided. Moreover, information regarding the outer surface areas will be provided, e.g. information regarding surface matching the outside of the model to differentiate the properties of the outer surface areas, e.g., closed outer surface, meshed, rough or any other kind of outer surface. This information of the outer surface may be provided in a "surface model". Based on these different outer surfaces, the new slicer slices the entire shoe depending on its size. Accordingly, different shoe sizes comprise section with different infill. Based on the individual slicing per shoe size, the properties of the shoe are substantially the same. For instance, the softness of a meshed outer surface of a shoe upper located between two different closed sections may have a different amount of infill connection lines when comparing a larger shoe with a smaller shoe. It is clear for a person skilled in the art that such a meshed outer surface of a larger shoe is larger than the corresponding meshed outer surface of a smaller shoe. Accordingly, the volume of the corresponding infill below said meshed outer surface of the larger shoe is also larger compared to the smaller shoe. However, since the amount of connection lines is substantially the same with regard to a same sized volume element, the properties, e.g., the softness, of said part of the shoe upper is substantially the same for different shoe sizes. Still in other words, according to the present invention, the amount of infill lines within a predefined volume element, e.g., 0.5 cm$^3$ is preferably the same for shoes of different sizes. This effect is, e.g., derivable from two shoes have a difference in size of 5 shoe sizes in EU sizing. In contrast thereto, prior art shoe models which are based on simple scaling have different number of infill connecting lines for different shoe sizes. In short, according to the present invention, the infill density (number of lines divided by volume) is substantially the same for different shoe sizes.

This new model also provides advantages when a designer or user wants to change the appearance of already designed surface areas and/or when the position of the surface areas is to be changed. According to the new approach, only respective parameters for the new slicer have to be changed, such that a start from scratch, i.e., as required in the prior art, is not necessary.

Exemplary implementation details of the present invention may be described as follows:

Handling areas with a mesh structure, e.g., without closed outer surfaces: During the slicing process, the invention focuses on creating an internal mesh infill (see e.g. region 52 in FIG. 5B and infill lines FIGS. 2A1 to 2A4). This infill is crucial for providing structural support within the shoe while minimizing material usage and print time. The absence of closed outer surface in these regions means that the software does not generate closed outer walls, thereby reducing complexity and ensuring that the interior mesh structure optimally supports the shoe's structure.

Figure 6:
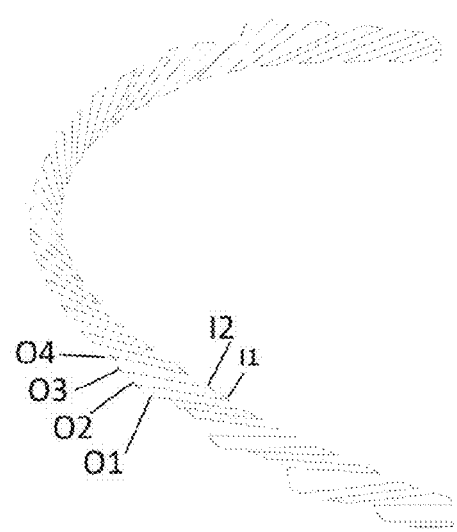
FIG. 6 shows a cross section of a printing layer of a shoe upper with an infill forming a meshed structure.

The process of printing a part of the shoe, e.g., the shoe upper, with a meshed structure on the outer surface is illustrated in FIG. 6.

In particular, FIG. 6 shows a printing layer for printing a meshed outer structure without closed outer surfaces. In this printing layer, there is no continuous outer shell printed but only parts of an outer shell with gaps in-between. By providing such gaps in the "outer shell" a mesh-like appearance of the shoe upper is possible. For printing such a meshed structure, outer points and inner points are constructed, wherein these outer points are then connected to other outer points or inner points. In particular, for the construction of the outer printing points O1, O2, O3 and O4, a virtual model of the shoe model may be used. These outer points O1, O2, O3 and O4 define the orientation of the infill connection lines. The orientation of the infill connecting lines, as illustrated for example with outer points O1 to O4 and inner points I1, I2. In a first step outer points O1-O4 are constructed. Then, inner points I1, I2 are constructed. Here, the infill is shown as a meander pattern. There is a connection line O1 to O2 along the outer contour of the shoe model. Next, O2 is connected to I1. I1 is connected to I2 along the inner contour line of the shoe model. I2 is connected to O3 and O3 is connected to O4. In other words, based on the constructed points on the outer contour of the shoe model, the infill connection lines are constructed, which can lead to very different orientations of the connection lines, which is very different from a regular infill pattern of the prior art.

Creation of walls at designated surfaces: In areas where the model specifies closed external surfaces (see e.g. region 53 in FIG. 5B)—whether textured or smooth—the algorithm takes a distinctive approach. It generates preferably at least one outer line, preferably two lines of walls inside the boundary of these surfaces by offsetting the surface inwards along a surface normal.

Integration with mesh infill: After establishing the outer wall line(s), the algorithm connects these walls to the internal mesh infill, preferably creating a unified and continuous print path or compensates the mesh positioning to incorporate the walls. An example of such an algorithm will be further discussed in the context of FIGS. 2A1 to 2A4. This integration is preferably advantageous for:

Ensuring structural cohesion: The seamless connection between the walls and the mesh infill reinforces the shoe's overall structure, distributing stress and wear evenly across the shoe.

Optimizing print efficiency: By printing in a continuous line, the process minimizes print stops and starts, enhancing the efficiency of the printing process and the quality of the final product.

Adapting to textured surfaces: When a surface is marked for a specific texture, the same principles of wall creation apply, with an additional step to apply the texture. The software preferably maps the texture onto dual walls (or just to the outside wall), ensuring that the texture's depth and pattern are accurately reproduced. This process allows for the precise application of complex textures, from rough, irregular surfaces to intricate, repeating patterns, directly onto the shoe's designated areas.

FIGS. 2A1 to 2A4 show a visualization of gcode for constructing an infill with a closed outer surface section according to a first embodiment of the present invention. According to this embodiment, a constant number of outer walls is provided regardless of the size of the shoe or the size of the shoe wall. In short, FIGS. 2A1-2A4 illustrate a new way of calculating with a new slicer where to maintain a constant of two walls placed on the outside. Preferably, the distance between said walls remains unchanged regardless of the shoe size.

FIGS. 2B1 to 2B4 show a visualization of gcode for constructing an infill with a closed outer surface section according to different approach. According to this example, the number of outer walls may very depending on the shoe size or the size of the shoe wall. In this example, a constant distance between the walls is maintained, but the number of walls changes based on how many can fit the model.

FIGS. 2C1-2C4 show a model made after slicing. It has two walls on the outside. Different shoe sizes are obtained by scaling down the gcode. Here, the number of walls remains constant, but the distance between the walls varies due to the scaling. Additionally, there is a difference not only in the distance between the walls but also between the walls and the mesh across different models.

It should be noted that FIGS. 2A1 to 2C4 are very schematic illustrations how outer closed surfaces (walls) adjacent to meshed regions may be constructed according to the present invention. In particular, the Y axis ranging from 0 to 1 represents the thickness of the shoe wall in arbitrary units, i.e., merely to illustrate that the relative thickness of the shoe wall and the respective position of outer closed walls may vary depending on the shoe size. The X axis represents the position along an outside of the shoe wall, again in arbitrary units.

Moreover, it should be also noted that the orientation of the infill connection lines between outer points (y=0.8, 0.6, 0,3 etc.) and inner points (y=0) is only schematic, i.e., the real orientation of the infill lines within a shoe wall, e.g., within a wall of a shoe upper, cannot be derived from said illustrations. In particular, as mentioned before, it is preferred that infill connection lines are not perpendicular to the outer and/or inner surface since such perpendicular result in a greater stiffness, which should be avoided according to the present invention. To illustrate such unfavorable infill lines, the infill lines 60 are shown obliquely or slanted. Thus, the illustrated infill line between y>0 and y=0 only means that there is an infill line between a respective outer point and the inner most point, which represents the inner surface of the shoe upper, but the angles of the infill line are not derivable from said schematic illustration.

Figure 2:
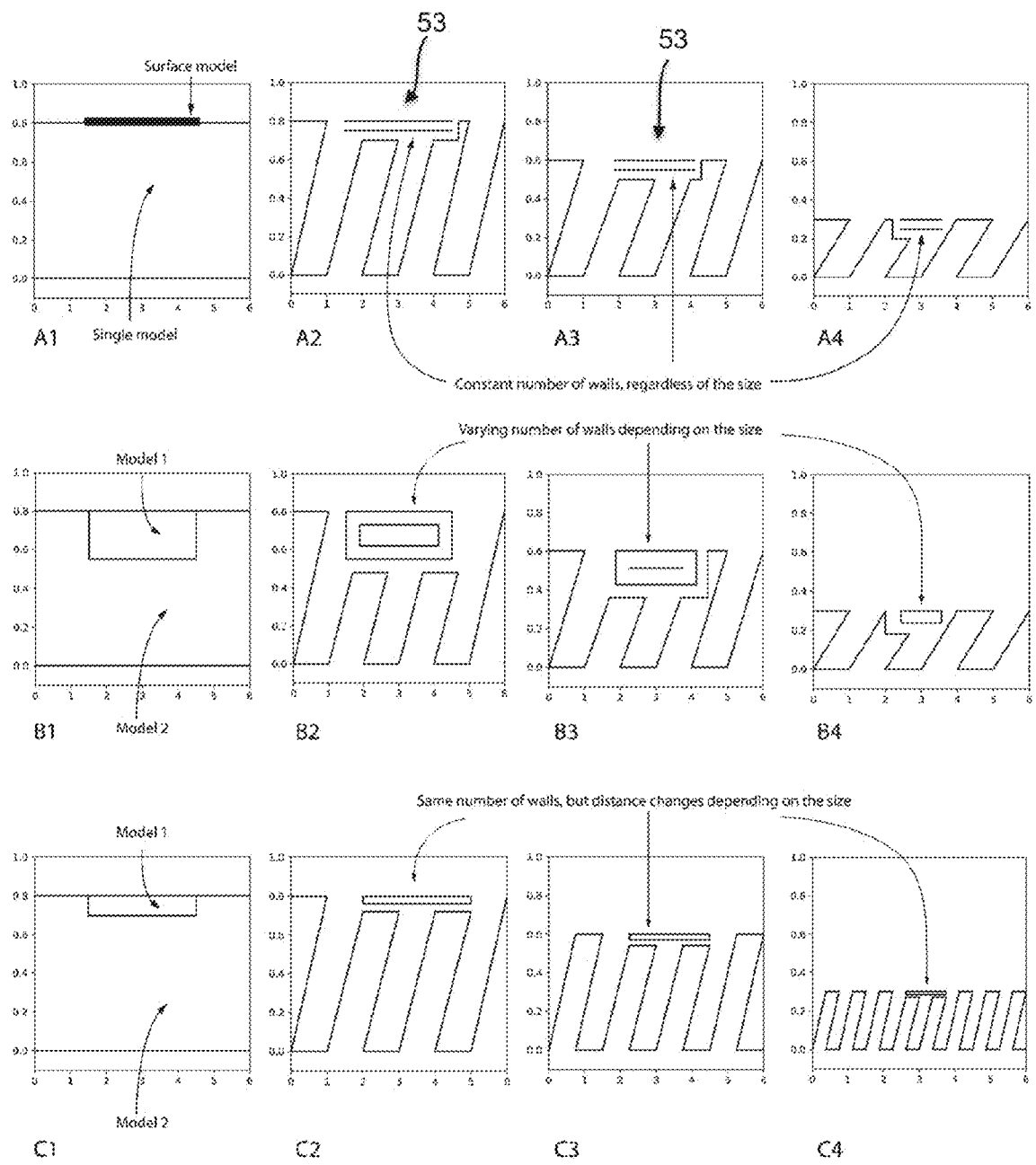
Figure 3:
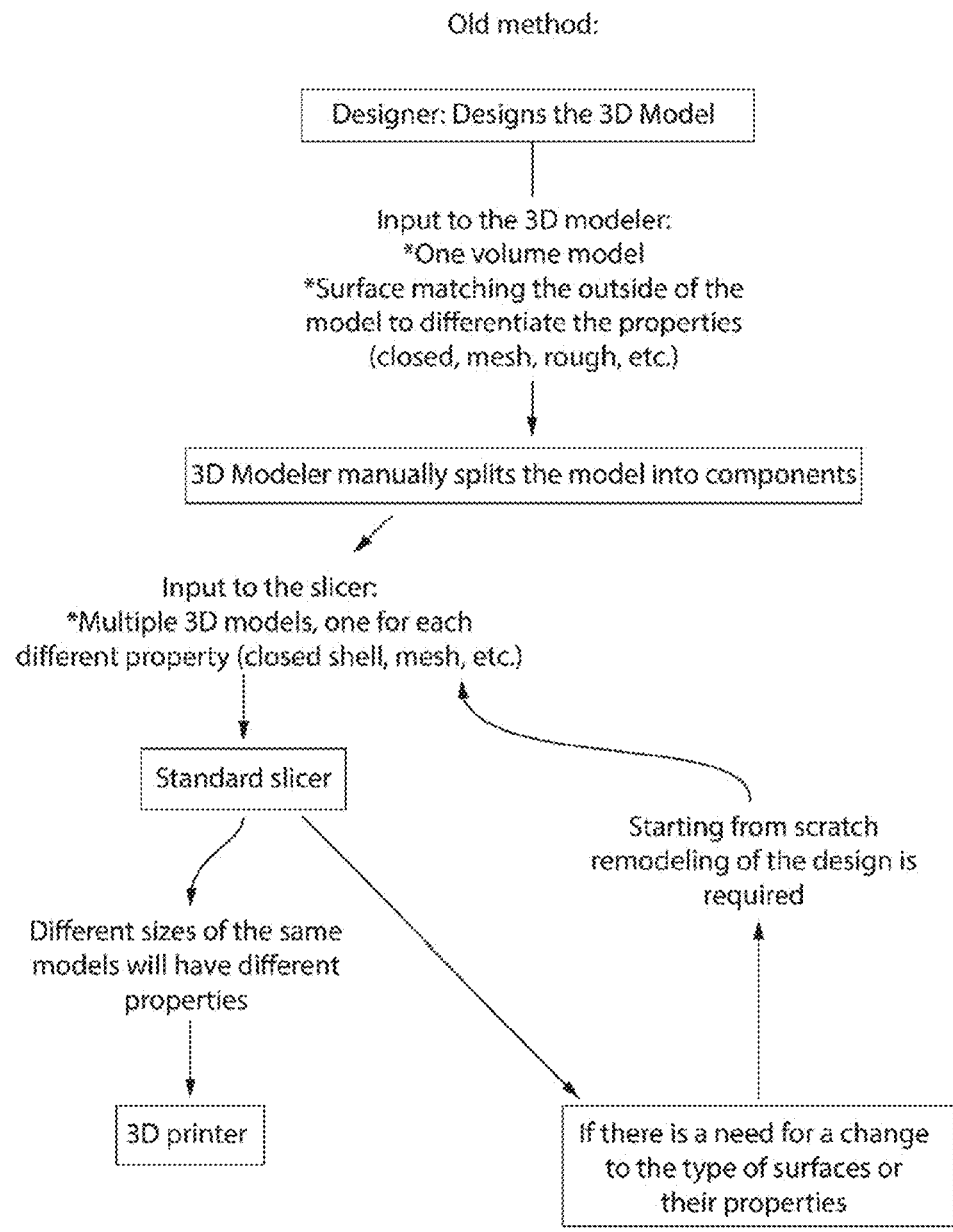
FIG. 3 is a flow chart of an existing prior art method illustrating steps from the design to the printed end product.

As directly derivable from FIGS. 2A2, 2A3, and 2A3, which represent the construction of sections with outer closed surface with a respective infill structure for different shoe sizes, in case an outer most closed part is printed, the infill connection lines start/end below said outer most point, i.e., below the outer most single wall or two outer most walls. According to an embodiment of the present invention, it might be desirable that at a specific position a closed outer surface (also called outer wall) is desired (see e.g. ref. number 53 in FIGS. 1A and 1C. FIG. 2A1 illustrates, for example, the location where the closed outer appearance is desired.

According to the present invention such a closed outer surface section may be realized by printing single outer wall (a single outer line in a layer-by-layer view), two outer walls, three outer walls, without being restricted to a number of outer walls. In the following, two outer walls are illustrated in FIGS. 2A2, 2A3, and 2A4, which often provides a sufficient result in view of stability of the outer section and flexibility of the respective region. FIG. 2A2 refers to a larger shoe with a respective wall thickness of the shoe upper of approximately 0.8 of an arbitrary unit, wherein FIG. 2A3 refers to a smaller shoe (0.6) and FIG. 2A4 to still a smaller shoe with a respective smaller thickness of the shoe upper (thickness between outer wall and inner wall), e.g., 0.3 of the arbitrary unit. The different shoe sizes all have two outer walls at the respective desired closed section. Based on said two outer walls and the respective thickness of the shoe upper, the infill is then individually constructed for the respective shoe size. Accordingly, the different shoe sizes are not merely an upscaling or downscaling of the printing pattern, as known from the prior art.

While the number of walls is consistent, uniformly scaling the gcode (as shown in FIGS. 2C1-2C4) creates differences in the distance between the lines, impacting the feel of the shoe, as more material will cover now smaller area. Moreover, scaling the gcode maintains the same print time and number of layers. For example, if a shoe size EU41 (length 26.2 cm) is scaled down to EU37 (length 23 cm), method C will have the same number of layers with a reduced layer height (approximately 87.5% of the original). In contrast, the approach illustrated in FIGS. 2A1-2A4 has 12.5% fewer layers to print. Thus, the approach illustrated in FIGS. 2A1-2A2 allows for faster printing of smaller shoe sizes and maintains a consistent feel, whereas method C increases stiffness for smaller sizes.

According to the present invention it is preferred that uniformity of the infill structure is maintained through consistent infill density, shape, and/or seamless transitions between different parts of the upper. For instance, when examining a cross-section of the shoe upper, one would observe a homogeneous material distribution, providing consistent properties such as flexibility, strength, and texture. This approach of the present invention enhances the overall durability, comfort, and aesthetic appeal of the shoe.

Such same infill structure is also derivable from FIGS. 2A1 to 2A4. In particular, the infill characteristics depend on the type of infill but are in general described by several parameters, including but not limited to infill density, shape, and angle. The infill density refers to the amount of material used within the structure, ensuring a balance between strength and weight. The infill shape pertains to the geometric pattern of the material, which can affect the flexibility and compressive strength of the shoe. The respective angle of the infill line also contributes to the overall structural integrity and performance of the shoe. It is preferred to keep all of these factors consistent to maintain the desired durability and comfort through the shoe.

FIGS. 5A and 5B also compare are cross-sectional gcode visualization of a printing layer of a shoe printed in accordance with the method of the present invention (FIG. 5B) and another method (FIG. 5A). For instance, FIG. 5A shows an island 530 which should be preferably avoided. As illustrated in this figure, the island 530 comprises additional infill walls (infill lines in a single printing layer), such that the stiffness at this point is enhanced, even the additional infill line is not perpendicular to the outer wall line. Such gcode visualization is similar to a cut through a printing layer.

Figure 5:
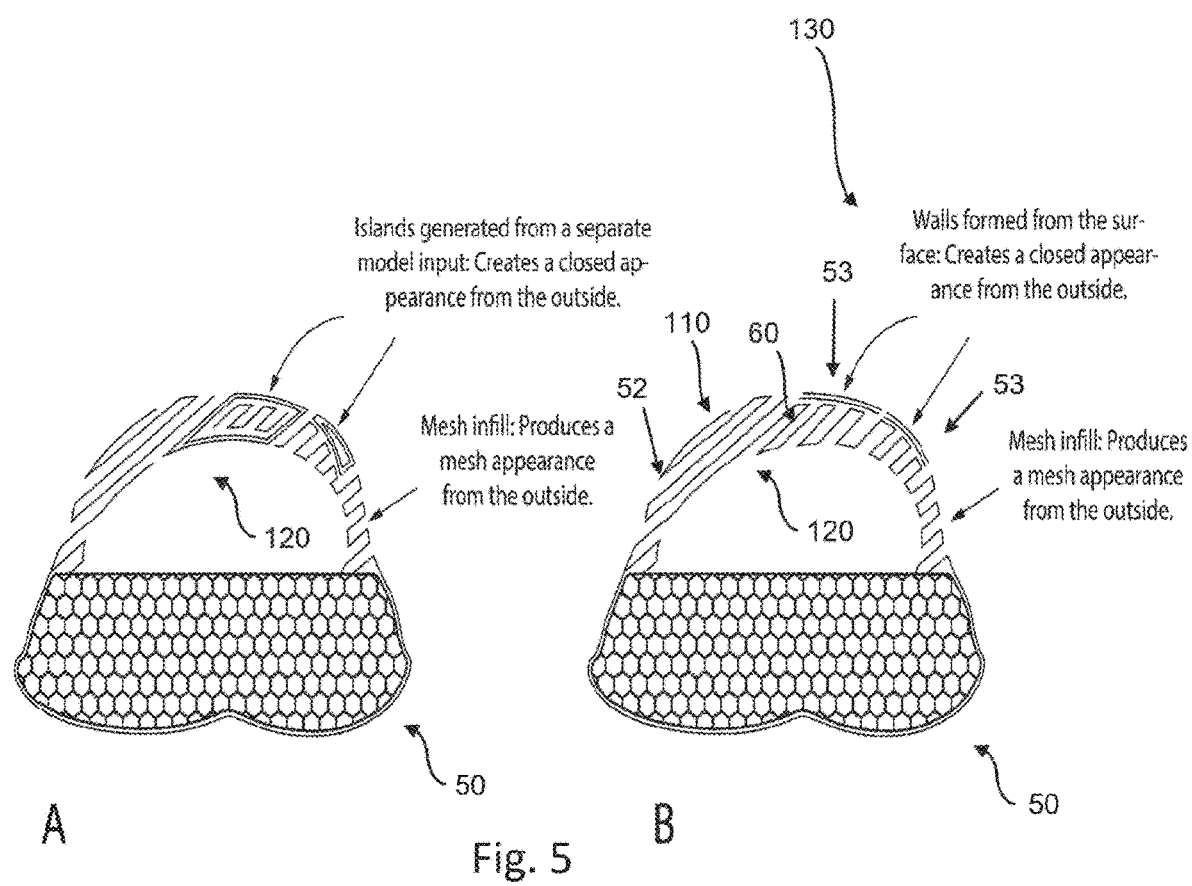
FIG. 5A is a gcode visualization of printing layer of a shoe with closed sections on the shoe upper.
FIG. 5B is a gcode visualization of a printing layer of a shoe with closed sections on the shoe upper according to the present invention.

In FIG. 5B shows a gcode visualization of a single printing layer which is similar to the embodiment as shown in FIGS. 2A1-2A4. In particular, a sole 50 is provided with a "honeycomb" infill pattern, which increases the stability of the sole 50. The shoe upper comprises in general a meshed structure at the outer surface 110 of the shoe upper except the two sections 53 with the closed outer surface structure. As derivable from said FIG. 5, the direction of the infill structure 60 is generally the same independent if the outer structure is meshed or closed. In other words, below the two walls of the closed outer structure 53, an intermediate section 130 is formed, which is similar to the adjacent infill pattern of the meshed section, but the infill connection lines are set back in relation to the outer surface. It should be noted that the shoe upper preferably provides a substantially flat (smooth) outer surface and preferably also a substantially flat (smooth) inner surface. In other words, there are no protrusions at the outer surface and/or the inner surface of the shoe upper.

According to a preferred embodiment of the present invention, at least one outer wall is desired to be placed on the outside (outer surface 110 of shoe upper 51), creating a protective and aesthetically changing outer surface. The infill 60 between this outer wall and the inner part (inner surface 120) of the shoe remains unchanged, ensuring uniformity in the structural properties throughout the shoe 100. This means that despite different outer appearances between the first and second portions, e.g., portions 53 and 54, the internal infill structure 60 maintains consistent density, shape, and alignment, providing seamless transitions and a cohesive overall design.

In this exemplary embodiment, the outer surface 110 is used as reference for placing the at least one wall or two walls on the outside of the infill mesh. By offsetting the surface inwards, it is possible to create at least one wall, filling the rest of the volume with the same infill present through the shoe. For instance, a zigzag infill pattern, characterized by its continuous back-and-forth parallel lines connected at the end, maintains uniformity through consistent line spacing, angle, and density. In this approach, at least one wall is placed on the outside, creating a protective and aesthetically pleasing outer surface. The infill between this outer wall and the inner part of the shoe remains unchanged, meaning the zigzag pattern maintains its defined parameters—such as the angle of the zigzag lines and the distance between them—across different portions. This ensures that despite different outer appearances between the first and second portions, the internal zigzag infill structure remains consistent, providing seamless transitions and cohesive overall design.

The following aspects relate to preferred embodiments of the present invention.

1. Method for designing and 3D printing a shoe (100), wherein said shoe (100) comprises a plurality of outer surface areas (52, 53, 54) with different outer surface properties, the method comprising:
   capturing design input data for a 3D shoe model defining the plurality of different surface areas (52, 53, 54);
   slicing the 3D shoe model based on the design input data with infill structures (60) at the different surface areas and based on a shoe size with an individual slicing model for said shoe size;
   printing the shoe in a print cycle based on the individual slicing model and the respective shoe size.
2. The method of aspect 1, wherein
   a. the infill structure of a smaller shoe differs from the corresponding infill structure of corresponding larger shoe;
   b. the number of infill connection lines forming the infill structure at or below a specific surface area differs from the corresponding surface area of a corresponding shoe with a different shoe size; and/or
   c. the number of outer wall lines within a printing layer at a surface area with a closed outer surface appearance is the same at corresponding surface areas of corresponding shoes for different sizes,
   d. wherein the difference in shoe size is preferably at least 5 shoe sizes in EU sizing.
3. The method of aspect 1 or 2, wherein the design input data of the shoe model are transformed into a one-volume-model of the entire shoe such that the slicing step is performed on said one-volume-model.
4. The method of aspect 3, wherein said one-volume-model allows a continuous slicing step across a cross-section through the entire shoe, which preferably allows for a one-stroke-printing of a single layer, preferably without retraction of the printing head during printing of said layer.
5. The method of any of aspects 1 to 4, wherein a user designs via a design platform
   i. locations on the outer surface of the shoe (100) where the plurality of outer surface areas (52, 53, 54) are desired; and
   ii. the surface properties of the plurality of outer surfaces, preferably by selecting individual properties form a predefined list, wherein the captured design data are based on this information i) and ii).
6. The method of aspect 5, wherein the design platform is provided a) via a web browser, b) via an app or c) via an application executable on an operating system of a computer.
7. The method of any of the preceding aspects, wherein design input data comprise data relating to the shoe size, wherein the slicing step is performed depending on the shoe size such that printed shoes of different sizes comprise infill structures which are not obtainable by scaling the slicing data of one shoe size to slicing data of another shoe size.
8. The method of aspect 7, wherein different sizes of the same printed shoe model have the same outer surface properties, preferably regarding mesh structure, mesh size, softness, etc.
9. The method of any of the preceding aspects, further comprising the step of allowing a user to select a customized fit by providing additional foot measurement data.

10. Method for 3D printing at least a part of a shoe, preferably an entire shoe (100), within a print cycle, wherein said shoe part (100) comprises a plurality of portions (52, 53, 54) arranged along the outer surface (110) of the shoe (100), a first portion (53) and a second portion (54) located directly adjacent to each other along the outer surface (110) of the shoe (100) having different outer appearances/surface properties/textures, wherein the first portion having preferably an outer mesh structure and the second portion having preferably an outer closed structure, the method comprising: additively printing the shoe part layer-by-layer,
   wherein at least one printing layer defines the outer surface (110) of the shoe, an inner surface (120) of the shoe and an intermediate section (130) which connects the outer surface (110) and the inner surface (120) by an infill structure (60),
   wherein the outer surface at the first portion (53) forms a closed outer surface and the appearance of the second portion (54) has a mesh outer structure, wherein the infill structure (60) at the first portion and second portion is substantially the same.

11. The method of aspect 10, wherein at least one printed infill connecting line extends from the first portion (53) to the second portion (54) without interruption.

12. The method of aspect 10 or 11, wherein at least two, preferably three, four or even more printed infill connecting lines extend from the first portion to the second portion without interruption, preferably without wall portions, which are oriented perpendicular to the outer surface, between the first portion and the second portion.

13. The method of any of aspects 10 to 12, wherein the same filling structure in the first and second portions is achieved by the same density of filling lines, the same angles of the same filling lines, the same distribution of filling lines and/or the same pattern of filling lines.

14. The method of any of aspects 10 to 13, wherein the transition of the infill between the first and second portions is seamless, for example, without intermediate, substantially vertical edge walls.

15. The method of any of aspects 10 to 14, wherein the inner side surface of the shoe, which gets into contact with the foot if worn, comprises a continuous inner structure, preferably a textile-like or mesh structure without seam-like edges.

16. The method of any of aspects 10 to 15 wherein
   a. printing a plurality of subsequent layers at the first portion (53) provide an outer surface of the first portion (53) with a continuous closed outer appearance and/or
   b. printing a plurality of subsequent layers at the second portion (54) provide an outer surface of the second portion (54) with a mesh structure outer appearance.

17. The method of any of aspects 10 to 16, wherein subsequently printed layers of the first outer surface comprise at least a continuous line along the outer surface in said first portion (53) and/or
   subsequently printed layers of the second outer surface comprise alternate printed lines and gap portions along the outer surface in said second portion (54).

18. The method of any of aspects 10-17, wherein a printed layer of the first outer surface comprises a continuous line along the outer surface as an outermost printed line to create the closed outer surface, and preferably comprises at least one second outermost line directly adjacent to said outermost printed line and inwardly to said outermost printed line,
   wherein the infill structure printed inwardly to said second outermost line preferably comprises connection lines to points on the inner surface,
   wherein said connection lines are preferably direct connections between points directly adjacent said second outermost line and points on to the inner surface, and/or
   connection lines with a meander pattern which comprise portions of third outermost lines which are intersected by gap parts of the meander along the second outermost line.

19. The method of any of aspects 10-18, wherein said infill structure of said first and second portions comprises a plurality of infill connecting lines connecting a point adjacent to the outer surface with a corresponding point on the inner surface,
   wherein each connecting line comprises an orientation angle ($\alpha$) with respect to a normal axis which is perpendicular to the outer surface,
   wherein the difference of orientation angles, $\Delta\alpha = \alpha_i - \alpha_{i+1}$, of two infill connecting lines which are directly adjacent seen along the outer surface in the printing layer, is smaller than 30°, preferably smaller than 20° preferably smaller than 10° in the first portion, second portion and/or a transition portion which is party build by the first and second portion.

20. The method of any of aspects 10-19, wherein inner surface (120) comprises at least at the upper of the shoe a seamless mesh structure, preferably to enhance the wearing comfort.

21. The method of any of aspects 10-20, wherein the first and second outer surfaces are located at the shoe upper (51), wherein the sole (50) of the shoe (100) is preferably printed with a continuous outer surface.

22. The method of any of aspects 10-21, wherein the pattern of a printed layer is printed continuously without retraction of a printing head, preferably the entire shoe is printed in one stroke/cycle.

23. The method of any of aspects 10-22, wherein the shoe comprises along the outer circumference more than two portions with different outer appearance, preferably more than three, more than four, and further preferred more than ten.

24. The method of any of aspects 10-23, wherein the first and the second portion, preferably more than two of the plurality of the portions are at least 0.5 cm long measured along the outer surface, preferably more than 1 cm, preferably more than 2 cm, and preferably less than 10 cm.

25. A 3D-printed shoe produced by additively printing the shoe layer-by-layer, preferably printed by a method according to any of aspects 10-24, wherein the shoe comprises:
   a plurality of portions (52, 53, 54) arranged along the outer surface (110) of the shoe (100), said plurality of portions (52, 53, 54) comprising at least a first portion (53) and a second portion (54) located directly adjacent to each other along the outer surface (110) of the shoe (100) having different outer appearances/surface properties/textures,
   wherein at least one printing layer defines the outer surface (110) of the shoe, an inner surface (120) of the shoe and an intermediate section (130) which connects the outer surface (110) and the inner surface (120) by an infill structure (60),
wherein the printing layer of the outer surface (110) at the first portion (53) forms a closed outer surface and the second portion (54) forms a mesh outer structure, wherein the infill structure (60) of the first portion and second portion is substantially the same.

26. At set of 3D printed shoes with at least two shoes with the same design but a different size, preferably printed by the same method, wherein the at least two shoes of different sizes comprise the same outer surface areas, scaled by a scaling factor, wherein the two shoes comprise:
the same number of outer lines in a printing layer, preferably two outer lines, which form a closed outer surface along a plurality of printed layers; and
wherein the distance between these two outer lines is the same for different sizes of shoes.

27. The set of shoes according to aspect 26, wherein at least two shoes have the same number of printed outer walls along a printing cross section independent of their size.

28. The set of shoes according to aspect 26 or 27, wherein
a. the infill structure of a smaller shoe differs from the corresponding infill structure of corresponding larger shoe;
b. the number of infill connection lines forming the infill structure at or below a specific surface area differs from the corresponding surface area of a corresponding shoe with a different shoe size; and/or
c. the number of outer wall lines within a printing layer at a surface area with a closed outer surface appearance is the same at corresponding surface areas of corresponding shoes for different sizes, preferably for all available sizes of shoes, e.g., from size 33 to size 48.

29. The set of shoes according to any of aspect 26 to 28, wherein different sizes of the same printed shoe model have the same outer surface properties, preferably regarding mesh structure, mesh size, softness, etc.

30. The set of shoes according to any of aspect 26 to 28, wherein the corresponding portions of the two shoes have the same density of filling lines, the same angles of the same filling lines, the same distribution of filling lines and/or the same pattern of filling lines, even the shoe size differs.

LIST OF REFERENCE SIGNS 50 sole
51 shoe upper
52 meshed outer structure
53 closed outer structure; first portion
54 meshed outer structure; second portion
60 infill structure, infill connection lines
100 shoe
110 outer surface
120 inner surface
130 intermediate section
530 island

What is claimed is:

1. A method for three-dimensional (3D) printing a shoe, within a print cycle,
wherein said shoe comprises a plurality of portions arranged along an outer surface of an upper of the shoe,
wherein the plurality of portions comprise a first portion and a second portion located directly adjacent to each other along the outer surface of the shoe comprising different outer structures,
wherein the first portion comprises an open outer structure, and
wherein the second portion comprises a closed outer structure,
the method comprising additively printing the shoe layer-by-layer,
wherein at least one printing layer defines the outer surface of the shoe, an inner surface of the shoe, and an intermediate section which connects the outer surface and the inner surface by an infill structure,
wherein the infill structure at the first portion and second portion is substantially the same and comprises a plurality of infill connecting lines connecting a point adjacent to the outer surface with a corresponding point on the inner surface.

2. The method of claim 1, wherein the open outer structure comprises a mesh.

3. The method of claim 1, wherein at least one printed infill connecting line extends from the first portion to the second portion without interruption.

4. The method of claim 1, wherein at least two printed infill connecting lines extend from the first portion to the second portion without interruption, which are oriented perpendicular to the outer surface, between the first portion and the second portion.

5. The method of claim 1, wherein the substantially same infill structure in the first and second portions is achieved by one or more of: the same density of infill connecting lines, the same angles of the same infill connecting lines, the same distribution of infill connecting lines, and the same pattern of infill connecting lines.

6. The method of claim 1, wherein a transition of the infill between the first and second portions is seamless, without intermediate, substantially vertical edge walls.

7. The method of claim 1, wherein the inner surface, which contacts a foot if worn, comprises a continuous inner structure.

8. The method of claim 7, wherein the continuous inner structure is textile-like without seams.

9. The method of claim 7, wherein the continuous inner structure is a mesh without seams.

10. The method of claim 1, further comprising one or more of:
a) printing a plurality of subsequent layers at the first portion to provide an outer surface of the first portion with a continuous closed outer appearance; and
b) printing a plurality of subsequent layers at the second portion to provide an outer surface of the second portion with an open structure outer appearance.

11. The method of claim 10, wherein the open structure outer appearance comprises a mesh.

12. The method of claim 1, wherein:
a) subsequently printed layers of the first outer surface comprise at least a continuous line along the outer surface in said first portion; or
b) subsequently printed layers of the second outer surface comprise alternate printed lines and gap portions along the outer surface in said second portion; or
c) both.

13. The method of claim 1, wherein a printed layer of the first outer surface comprises a continuous line along the outer surface as an outermost printed line to create the closed outer surface, and at least one second outermost line directly adjacent to said outermost printed line and inwardly to said outermost printed line, wherein the infill structure is printed inwardly to said second outermost line and comprises connecting lines to points on the inner surface, and wherein said connecting lines comprise one or more of: a) direct connections between points directly adjacent said second outermost line and points on the inner surface, and b) connecting lines with a meander pattern which comprise portions of third outermost lines which are intersected by gap parts of the meander along the second outermost line.

14. The method of claim 1, wherein each connecting line comprises an orientation angle ($\alpha$) with respect to a normal axis which is perpendicular to the outer surface, and wherein the difference of orientation angles, $\Delta\alpha = \alpha_i - \alpha_i + 1$, of two infill connecting lines which are directly adjacent seen along the outer surface in the printing layer, is smaller than 30°, smaller than 20°, or smaller than 10° in the first portion or the second portion.

15. The method of claim 1, wherein the inner surface comprises, at least at the upper of the shoe, a seamless mesh structure.

16. The method of claim 1, wherein a sole of the shoe is printed with a continuous outer surface.

17. The method of claim 1, wherein at least one of the printing layers is printed continuously without retraction of a printing head.

18. The method of claim 17, wherein the entire shoe is printed continuously without retraction of a printing head.

19. The method of claim 1, wherein the shoe comprises, along the outer surface, more than 3, more than 5, or more than 10 portions with different outer structures.

20. The method of claim 1, wherein the first and the second portion are at least 0.5 cm, at least 1 cm, or at least 2 cm long, but less than 10 cm long, measured along the outer surface.

21. The method of claim 1, further comprising receiving design input data for a 3D shoe model defining the plurality of portions arranged along the outer surface of the upper of the shoe.

22. The method of claim 21, wherein the design input data further defines physical properties for the upper of the shoe.

23. The method of claim 22, wherein the infill structure is determined to impart the defined physical properties to the upper of the shoe.

24. The method of claim 1, wherein the 3D printing is extrusion 3D printing.

25. The method of claim 1, wherein the method is repeated to 3D print a set of shoes, wherein the set of shoes comprises at least two shoes with the same design but a different size, wherein the at least two shoes of different sizes comprise the same outer surface areas, scaled by a scaling factor, wherein the at least two shoes comprise a same number of outer lines in a printing layer, which form a closed outer surface along a plurality of printed layers, and wherein a distance between two of the outer lines is the same for different sizes of shoes.

26. The method claim 1, wherein the method is repeated to 3D print a set of shoes, wherein the set of shoes comprises at least two shoes with the same design but a different size, wherein the at least two shoes of different sizes comprise the same outer surface areas, scaled by a scaling factor, and wherein corresponding portions of the at least two shoes comprise one or more of: same density of infill connecting lines, same angles of the same infill connecting lines, same distribution of infill connecting lines, and the same pattern of infill connecting lines, in shoes of different sizes.

* * * * *